(12) United States Patent
Gupta et al.

(10) Patent No.: US 7,590,981 B2
(45) Date of Patent: Sep. 15, 2009

(54) UPDATE PACKAGE FOR OFFLINE SYNCHRONIZATION OF SOFTWARE UPDATES

(75) Inventors: Rahul Gupta, Bellevue, WA (US); Ullattil Shaji, Sammamish, WA (US); Derek P. Menzies, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 92 days.

(21) Appl. No.: 11/096,963

(22) Filed: Mar. 29, 2005

(65) Prior Publication Data

US 2006/0080651 A1   Apr. 13, 2006

Related U.S. Application Data

(60) Provisional application No. 60/618,282, filed on Oct. 12, 2004.

(51) Int. Cl.
*G06F 9/44* (2006.01)
*G06F 9/445* (2006.01)

(52) U.S. Cl. .................................... 717/168; 717/174
(58) Field of Classification Search .......... 717/168–173
See application file for complete search history.

(56) References Cited

U.S. PATENT DOCUMENTS

| | | | |
|---|---|---|---|
| 6,493,871 B1 * | 12/2002 | McGuire et al. | 717/173 |
| 6,735,766 B1 * | 5/2004 | Chamberlain et al. | 717/173 |
| 7,062,764 B2 * | 6/2006 | Cohen et al. | 717/171 |
| 7,373,376 B1 * | 5/2008 | Hamer et al. | 709/203 |
| 2002/0078142 A1 * | 6/2002 | Moore et al. | 709/203 |
| 2002/0078222 A1 * | 6/2002 | Compas et al. | 709/232 |
| 2002/0080166 A1 * | 6/2002 | Sweatt et al. | 345/738 |
| 2003/0028617 A1 * | 2/2003 | Taylor | 709/217 |
| 2004/0083472 A1 * | 4/2004 | Rao et al. | 717/171 |
| 2004/0205168 A1 * | 10/2004 | Asher | 709/220 |

OTHER PUBLICATIONS

Mark Messier, "Offline Software Update", Aug. 9, 2003, retrieved from <http://ppd.fnal.gov/experiments/e907/Meetings/collab9/messier.pdf>, pp. 1-10.*
Mark E. Segal, "Online Software Upgrading: New Research Directions and Practical Considerations", retrieved from <http://ieeexplore.ieee.org/stamp/stamp.jsp?tp=&arnumber=1045133>, pp. 1-5.*
Shavlik HFNetChkPro™, Shavlik Technologies, Roseville, MN, 1-page advertising brochure.

* cited by examiner

*Primary Examiner*—Tuan Q Dam
*Assistant Examiner*—Marina Lee
(74) *Attorney, Agent, or Firm*—Workman Nydegger

(57) ABSTRACT

The description of an update package for updating a software application in an offline synchronization operation is presented. The update package includes update information for a plurality of updates. The update information includes a reference to the update payload and the relationships of the present update to other updates in the update package. A system for updating a software application on a client computer is also presented. An update agent includes a communication module and a media module. The communication module is configured to communicate with both an update source over a communication network, or the media module. The media module obtains update information from computer-readable media. The communication module communicates with the update source or the media module in the same manner.

19 Claims, 6 Drawing Sheets

```
<element name="OfflineSyncPackage" type="ols:OfflineSyncPackage" />
<complexType name="OfflineSyncPackage">
   <sequence>
```

*502*

```
<element name="ConfigProperties" minOccurs="0">
   <complexType>
      <sequence>
         <element name="Property" minOccurs="0" maxOccurs="unbounded">
            <complexType>
               <attribute name="name" type="string" use="required" />
               <attribute name="value" type="string" use="required" />
            </complexType>
         </element>
      </sequence>
   </complexType>
</element>
```

*504*

```
<element name="Updates">
   <complexType>
      <sequence>
         <element name="Update" type="ols:Update" maxOccurs="unbounded" />
      </sequence>
   </complexType>
</element>

<element name="FileLocations" type="ols:FileLocationMap" minOccurs="0" />
```

```
   </sequence>
```

*506*

```
<attribute name="ContainsPayload" type="boolean" use="optional" default="false" />
<attribute name="ContainsEULAs" type="boolean" use="optional" default="false" />
<attribute name="MinimumClientVersion" type="bt:Version" use="required" />
<attribute name="ProtocolVersion" type="ols:VersionMajorMinor" use="required" />
<attribute name="PackageId" type="bt:Guid" use="required" />
<attribute name="SourceId" type="bt:Guid" use="required" />
<attribute name="CreationDate" type="dateTime" use="required" />
<attribute name="PackageVersion" type="ols:VersionMajorMinor" use="required" />
```

```
</complexType>
```

*Fig. 5.*

UPDATE PACKAGE FOR OFFLINE SYNCHRONIZATION OF SOFTWARE UPDATES

CROSS-REFERENCE TO RELATED APPLICATION

This application claims the benefit of U.S. Provisional Application No. 60/618,282, filed Oct. 12, 2004.

FIELD OF THE INVENTION

The present invention relates to computers and software updates on computers, and more particularly, to an update package for offline synchronization of software updates on a computer system.

BACKGROUND OF THE INVENTION

Connectivity to computer networks, and more particularly to the Internet, has revolutionized the manner in which software is updated on a computer system. Prior to the near-universal connectivity to networks and the Internet, when a software update became necessary and available, a software provider would package the update on computer readable media, and the computer owner had to obtain a copy of the media to complete the update. However, distributing software updates on computer readable media was typically very expensive for software providers, especially for those software applications that were widely used. This cost tended to restrict the number of software updates that a software provider would issue. As a consequence, substantial time passed between updates, and consumers had to "deal" with known issues for these time periods, at least until an update became available. Another aspect of this older method was that many modifications were packaged into a single update to reduce the costs associated with distributing the update.

As mentioned above, network connectivity has changed this scenario. Now, software updates are typically made available on one or more download sites just as soon as the software provider can produce them. Indeed, in this manner, software providers can be much more responsive to critical flaws, security concerns, and general customer needs. Thus, to remain current, a customer simply queries an update site for software updates, and downloads and installs software updates if they are available. (Of course, most software applications provide the customer with substantial control over the download/installation process, including which software updates to install.) Another benefit is that updates have become more focused, i.e., a software update may address only a single item, and customers can pick and choose which update items are necessary for them to install.

FIG. 1 is a pictorial diagram illustrating a typical, simplified exchange between a client computer and an update source when obtaining software updates over a network, as is currently practiced in the industry. As indicated by query 108, a client computer 102 issues a query over a network 106 to a software provider's download site, referred to hereafter as an update source 104, to determine whether any software updates are available for the client computer. In query response 110, the update source 104 responds to the client computer 102 with update information indicating which, if any, software updates are available.

When there are available updates, the client computer 102 issues an update request 112 to the update source 104 for the software updates applicable to the client computer. The update source 104 responds 114 to the client computer 102 with the software updates requested by the client computer in the update request 112. After the client computer 102 has received the software updates, the client computer 102 installs the received updates, as indicated by arrow 116.

Naturally, one of the benefits of updating software over a network connection is that the cost associated with producing and distributing software updates is almost entirely eliminated. Additionally, software updates now occur more frequently, especially those addressing critical issues and security. Still further, a computer user has greater control as to when and which software updates should be installed on the client computer.

Unfortunately, as those skilled in the art will appreciate, a client computer, such as client computer 102, cannot always be connected to, or have access to, an update server 104. This lack of connectivity may arise because the network 105 is temporarily unavailable, or because of security concerns that dictate that the client computer is not able to access external sites, or that external sites are not able to transmit information to the client computer. In such cases, because software applications are designed to be updated over a network, the current system for updating software applications becomes broken. The typical solution is to revert to previous update techniques: i.e., provide software updates on computer readable media. But this has meant that the software application (and software provider) must support two methods for updating the application. This is undesirable.

In addition to simply updating a software application, its often desirable, for a variety of reasons, to determine whether the version a software application on a client computer 102 is the latest available from the software provider. Online connectivity has been a great boon to this facet of software updates, i.e., determining whether the version of a software application on a client computer 102 is the latest version available. Relatively small communication exchanges between the client computer 102 and the update source 104 over the network 106 are used to determine whether the latest version is installed, and if not, to determine what software update is needed to upgrade the software application to the latest version. These communications are small because the actual updates, i.e., the update payloads that effectuate the update on the client computer 102, are not exchanged.

In an offline situation, i.e., when network connectivity is unavailable or prohibited, providing software updates on computer-readable media is not a desirable solution when the user simply wants to determine whether the version of the software application running on the client computer 102 is the latest version available. However, at least one solution has been set forth to address this situation.

HFNetChkPro, by Shavlik Technologies, is a program that can be used to analyze a software application and determine whether that software application is the latest revision. It performs this analysis using a patch file that identifies the latest revisions, and possibly includes intermediate steps to fully realize the latest revisions. Using the patch file, the HFNetChkPro identifies whether the software application is up-to-date, and in some cases, is further able to instigate an update process. However, this solution is not without its own set of problems. First, the HFNetChkPro system does not address what happens when the computing device 102 cannot communicate with the update source 104. In other words, even though the HFNetChkPro system identifies that later revisions are available, if the communication channels are closed, no update can occur. Second, the HFNetChkPro system, being a separate product from the update process on the client computer 102, uses a different file than the update process. As such, discrepancies between what the HFNetChkPro system believes as the latest revisions and what the update process views as the latest revisions may vary substantially.

What is needed is a system and method that enables a software application to perform software updates in a consistent manner, irrespective of whether the update information is available over a network connection or on computer readable media. Indeed, what is needed is an efficient system for delivering software updates and attendant update information to a client computer 102 in an efficient format that enables the update process on the client computer to use the same update files and operate in the same manner is if it were communicating with the update source 104 over a communication network 106. The present invention addresses these issues, as well as other issues found in the prior art.

SUMMARY OF THE INVENTION

According to aspects of the present invention, a computer-readable medium bearing an update package for use by an update agent to perform an offline update of a software application on a client computer is provided. The update package comprises an update catalog file, and set of update fragments. The update catalog file comprises a list of updates available in the update package, and a table of file locations corresponding to each update available in the update package. For each update available in the update catalog file there is a corresponding set of update fragments According to additional aspects of the present invention, a software update package for use by an update agent executing on a client computer for updating a software application in an offline manner is provided. The software update package comprises an update catalog file and a plurality of update fragments. The update catalog file is an XML file formatted according to a predetermined schema. The update catalog file includes a list of updates available in the update package, and a table of file locations of files corresponding to each update available in the update package. For each update available in the update package a corresponding set of update fragments is included in the update package.

According to still further aspects of the present invention, a software update system implemented on a client computer for updating a software application on the client computer from an update package located on computer-readable media is provided. The software update system comprises an update agent that updates the software application on the client computer according to software update data from an update source. The update agent includes a communication module and a media module. The communication module is configured to obtain software update data from the update source over a communication network, and also from a media module. The media module is configured to obtain software update data stored on computer-readable media. The media module is further configured to implement the same communication interfaces as the update source when the communication module communicates with the update source over the communication network. The communication module is further configured to communicate with the media module in the same manner as it would communicate with the update source.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 illustrates a portion of an exemplary update catalog file schema according to an actual embodiment of the present invention

DETAILED DESCRIPTION

Figure 2:
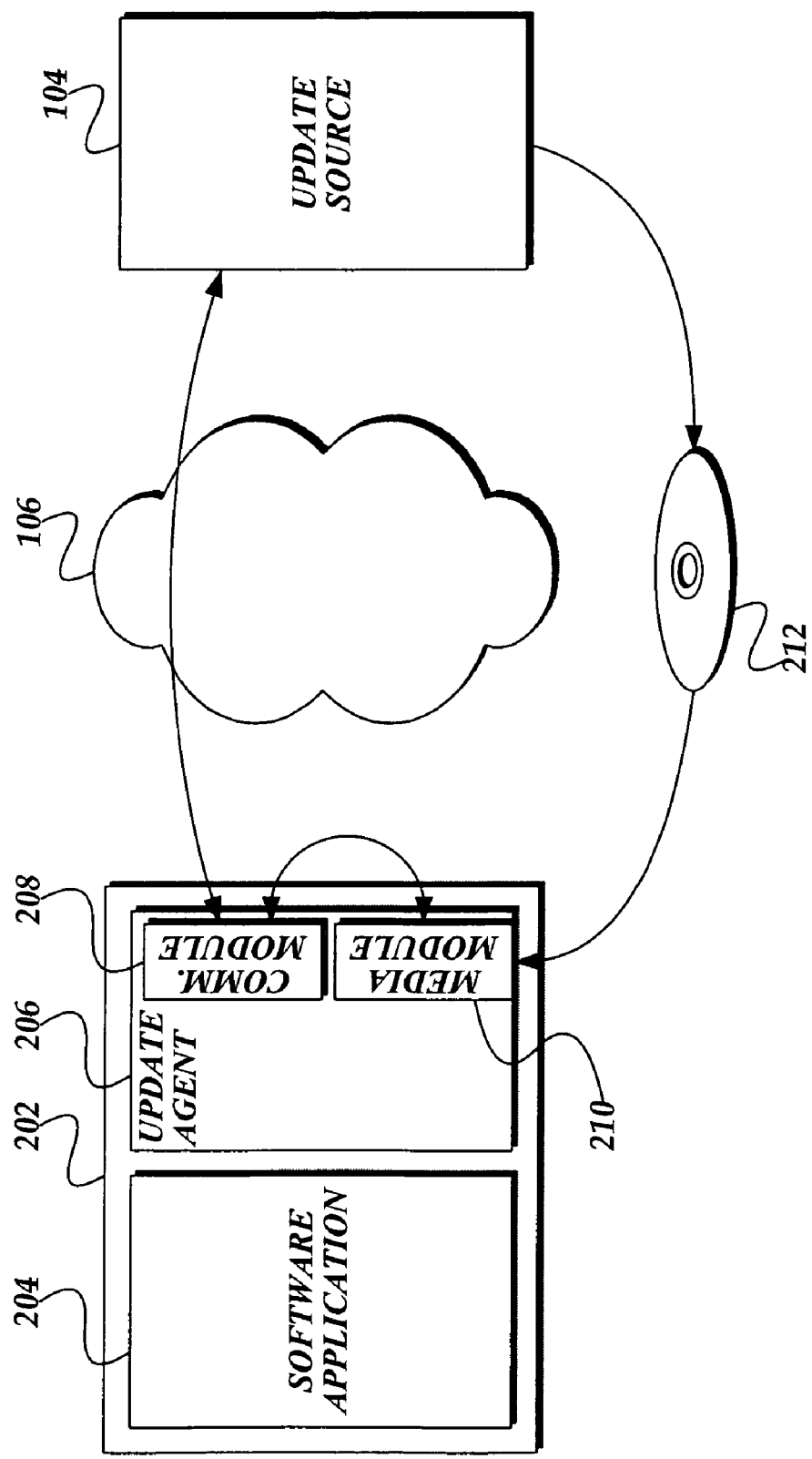
FIG. 2 is a pictorial diagram illustrating a client computer configured according to aspects of the present invention to communicate with an update source alternatively through a computer network or in an offline synchronization manner via a generated update package.

FIG. 2 is a pictorial diagram illustrating a client computer 202 configured according to aspects of the present invention to communicate with an update source 104 either through a computer network 106 or in an offline synchronization manner via a generated update package. The client computer 202 includes a typical configuration including at least one software application 204 and an update agent 206. The software application 204 communicates with the update agent 206 to perform software updates for the software application on the client computer.

While many people familiar with computers are also familiar with software applications such as word processor programs, calculators, spreadsheet programs, database programs, and the like, these are only one type of software application. For the present invention, it should be understood that software application is used generically for any type of software running on a computing device that can be updated by an update agent 206 either from an update source 104 or in an offline synchronization manner via a generated update package. Thus, in addition to the exemplary software application identified above, software applications may also include an operating system, device drivers, and the like.

Figure 1:
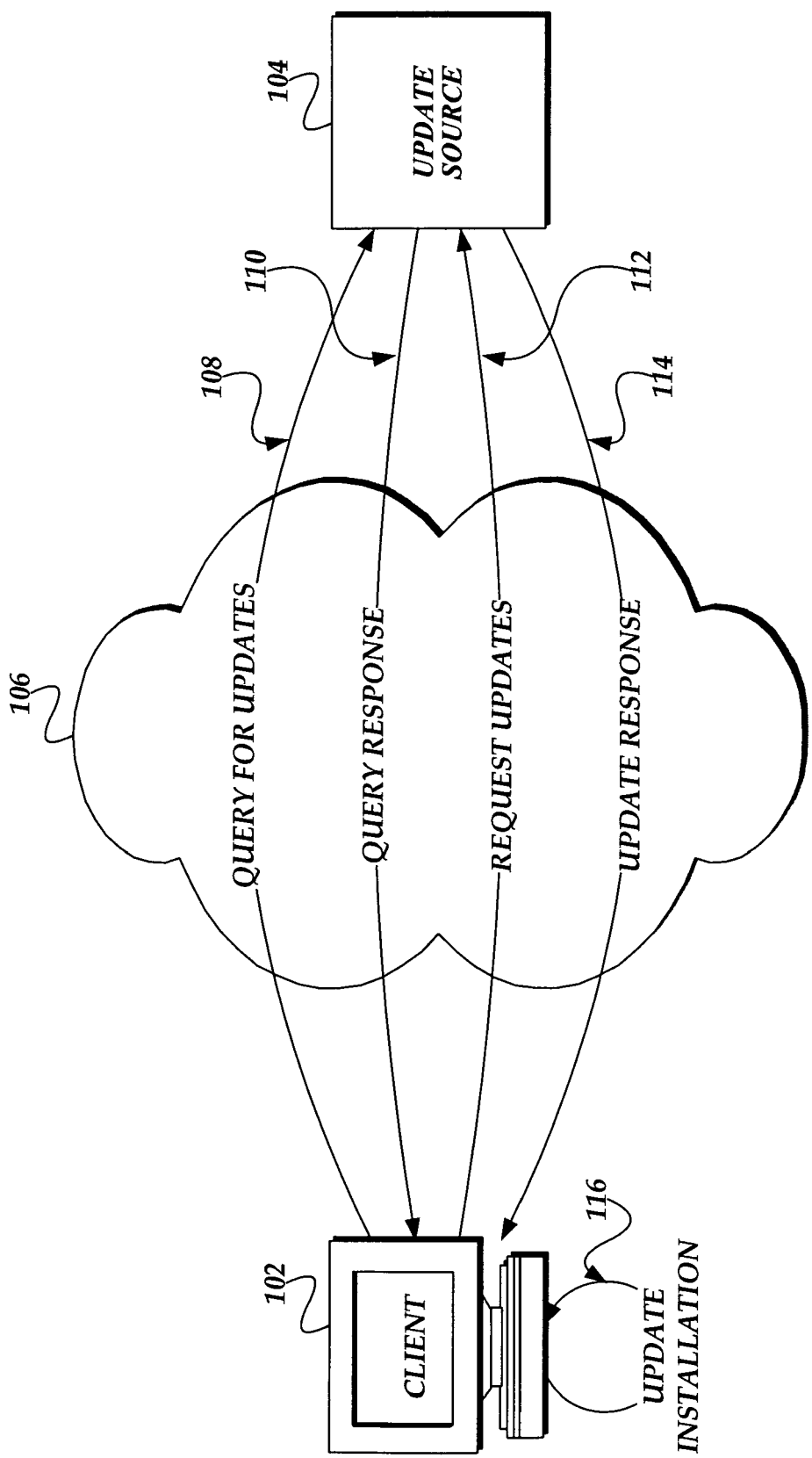
FIG. 1 is a pictorial diagram illustrating a typical, simplified exchange between a client computer and an update source in obtaining software updates over a network, as is currently practiced in the industry.

The update agent 206 includes a communication module 208 that is configured to communicate over a computer network 106 with an update source 104. A simplified update communication exchange is described in regard to FIG. 1.

In addition to the communication module 208, the update agent 206 also includes a media module 210. The media module 210 reads data from computer-readable media 212 to perform all or portions of the software update that is performed via the communication module 208. The computer-readable media 212 includes an update package that has been generated from update information from the update source 104 such that a software update may progress even when the communication over the computer network 106 is unavailable.

According to aspects of the present invention, except for some initialization calls with regard to directing the update agent 206 to the computer-readable media 212 for update information, the remainder of the software update process behaves exactly as though the update agent 206 were communicating in an online manner with the update source 104. In particular, the communication module, after having been initialized/redirected from direct communication with the update source 104 to communication with the media module 210, operates using the same communication calls as if it were communicating with the update source directly. In other words, the update agent 206 and the software application 204 are generally completely unaware of the source of update information, whether it arrives over the computer network 106 from the update source 104, or whether the update information is obtained from the computer-readable media 212 via the media module 210. This is accomplished as the media module implements and responds to the same interfaces and calls as does the update source 104 in online communications.

It should be understood that while FIG. 2 shows the software application 204 as separate from the update agent 206, it is for illustration purposes only and should not be construed as limiting upon the present invention. In an alternative embodiment, a software application 204 may include its own update agent 206, that communicates with an update source 104 or computer-readable media 212, as an integral part of the software application.

It should also be understood that the update agent 206 may include numerous additional modules that are not illustrated in FIG. 2, such as a module to process update logic in an update, a module to implement a software update on the client computer 202, and the like. Additionally, while the communication module 208 and media module 210 are shown as separate modules, it is a logical separation only. In an alternative embodiment, the media module 210 may be implemented in the logic of the communication module 208. Accordingly, the above-described embodiment should be viewed as exemplary and illustrative only, and not be construed as limiting upon the present invention.

According to an actual embodiment of the present invention, the update source 104 implements a set of Web services for providing update information and updates to client computers. Similarly, the media module 210 implements the same Web service interface such that the communication module can communicate with either the update source 104 or the media module 210 in the same manner without being aware of the source of the update information.

Those skilled in the art will appreciate that it is often desirable to simply determine whether software updates are applicable, i.e., whether the client computer 204 is up-to-date, even though there is no immediate plan to install any software updates. In this situation, according to aspects of the present invention, the present invention offers significant benefits over other update systems. More particularly, with regard to the update package on the computer-readable media 212, the media module 210 uses the same update package to both determine whether software updates are applicable for the client computer 204, as well as to carry out the installation of the applicable updates on the client computer. Benefits arise in the fact that the update data is the same whether it is retrieved directly from the update source 104 over a communication network 106, or from an update package on computer-readable media. In addition, the modules that determine whether an update is applicable to a client computer 102 is also the same module that is used in installing the update, such that no discrepancies arise between what one file (update package) may indicate as an applicable update and the information that an update agent 206 will use to ultimately determine what is an applicable update during installation. Additionally, according to aspects of the present invention, in scanning for applicable updates, relevant update information is retained from the time that a determination is made as to applicable updates until the actual update process is completed. Furthermore, if the update payload is not included with the update package, as discussed in greater detail below, the location of the update payload can be obtained from the update package and the update payload may be separately obtained/downloaded and provided to the update agent 206 during update installation.

Figure 3:
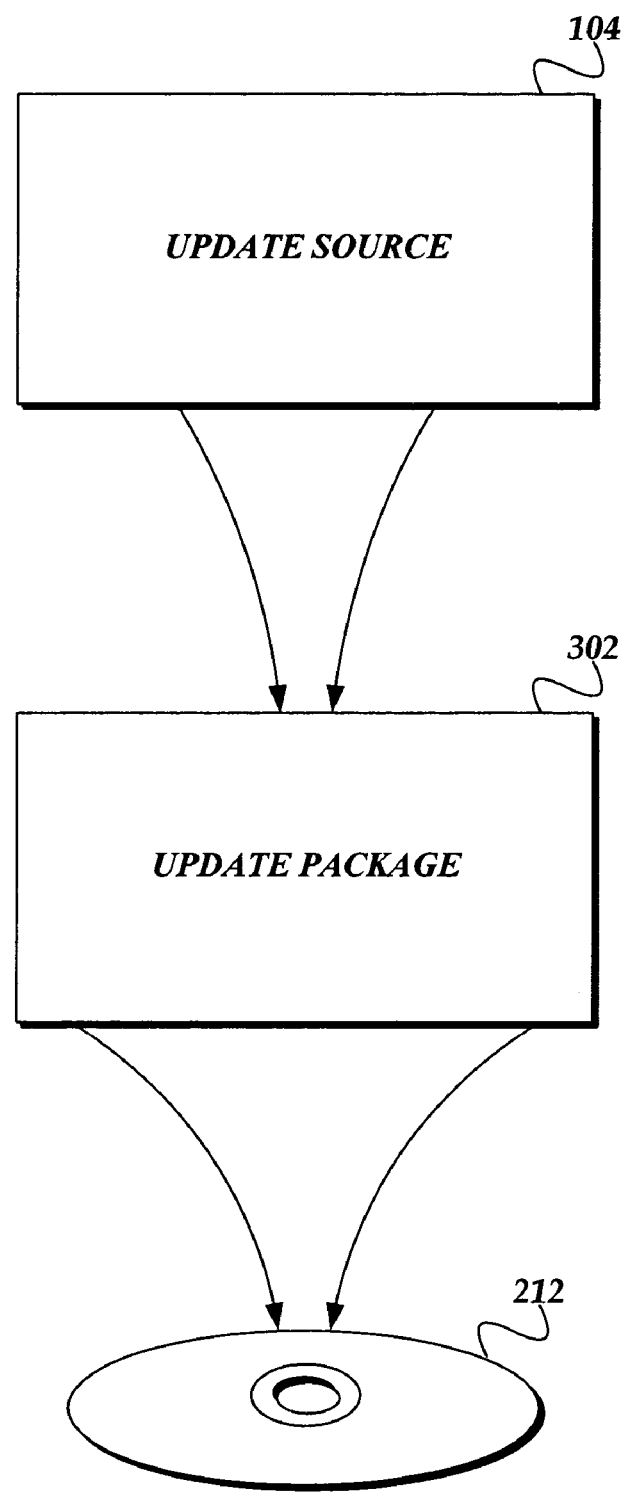
FIG. 3 is a block diagram illustrating the generation of an update package from an update source that is subsequently stored on computer-readable media.

FIG. 3 is a block diagram illustrating the generation of an update package from an update source that is subsequently stored on computer-readable media. More particularly, in order to allow for offline synchronization (i.e., updating from an update package stored on computer-readable media), an update package 302 must be generated and placed on computer-readable media such that it can be accessible to the client computer 202. Of course, it should be understood that the computer-readable media may comprise any number of actual embodiments including, but not limited to, a local hard drive of the client computer 202, a hard drive on a computer network not connected to the update source 104, removable media such as a CD disc, a DVD disc, a diskette, portable hard drives, flash memory devices, and the like.

Due to their storage capacity, DVD discs are an especially suitable medium for delivering update packages. One reason is that DVD discs offer substantial storage capacity. With a large storage capacity, both update information and update payloads may be delivered on the media. "Update payload" refers to the update files used during installation of the update on a client computer. An update payload may include, but is not limited to, a file that is copied to the client computer, a program whose execution effectuates modifications on the software application, and the like. In contrast, "update information" may be viewed more as directions or a guide by which an update agent determines which updates are applicable and necessary, relationships between updates, localized properties, human readable descriptions of the updates, problems that the updates resolve, as well as how to implement or effectuate an update on the client computer.

To generate a computer-readable media 212 adapted to provide offline synchronization to a client computer, a generation process obtains update information, and possibly update payloads, at the update source 104 and generates and update package 302 that can be used by the media module 210 in an offline synchronization of a software application. The generation process may be executed on the update source 104, or alternatively may be executed on a computer external to the update source 104.

Figure 4:
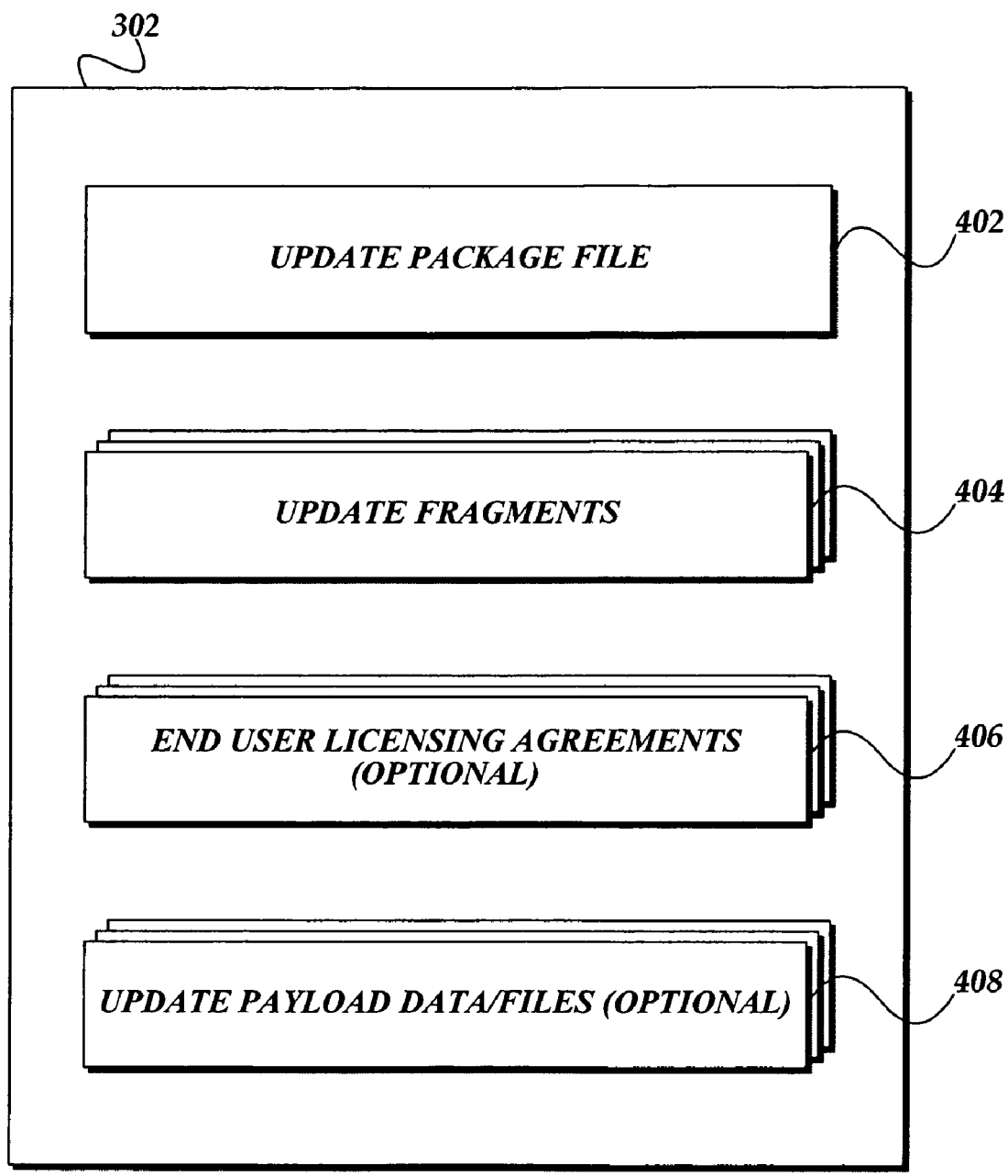
FIG. 4 is a block diagram illustrating exemplary components of an update package suitable for use by a client computer configured according to aspects of the present invention in performing an offline synchronization.

FIG. 4 is a block diagram illustrating exemplary components of an update package 302 suitable for use by a client computer configured according to aspects of the present invention in performing an offline synchronization. In particular, an update package includes an update catalog file 402, one or more update fragments 404, any number of optional end user licensing agreements (EULAs) 406, and optional update payload data/files 408.

The update catalog file 402 includes, but is not limited to, update package configuration properties and information, a list of updates included in the update package 302, a list of EULAs included in the update package, an update payload data/files table identifying the location of the update payload data/files, and the like. The configuration properties set forth in the update catalog file 402 typically include, but are not limited to: an indication as to whether update payload data and/or files are included with the update package 302; an indicator signaling whether EULAs are included with the update package; a minimum software application revision number; a minimum update agent version number, protocol definitions and/or version number used in generating the update package; an update package identifier that uniquely identifies the update package; an update source identifier to uniquely identify the source of the updates included in the update package; the update package creation date; update package version number; and the like.

According to an actual embodiment, the update catalog file 402 is an XML document formatted according to a predetermined schema. FIG. 5 is a block diagram illustrating a portion of the exemplary, predetermined schema for the update catalog file 402. As can be seen in FIG. 5, the exemplary schema 500 defines configuration properties 502, an update section 504, and other additional properties 506, such as minimum client version, package creation date, and the like, as described above. Of course, FIG. 5 illustrates only a portion of an actual schema used to generate the update catalog file 402. Those skilled in the art will appreciate that numerous definitions and sequencing information will be included in a complete schema, but such information has been excluded from FIG. 5 for readability purposes. However, a complete listing of an actual embodiment of the schema is set forth below in the following table.

```
<?xml version="1.0" encoding="UTF-8" ?>
<schema xmlns="http://www.w3.org/2001/XMLSchema"
            targetNamespace="http://schemas.microsoft.com/msus/2004/02/OfflineSync"
            xmlns:ols="http://schemas.microsoft.com/msus/2004/02/OfflineSync"
            xmlns:upd="http://schemas.microsoft.com/msus/2002/12/Update"
            xmlns:bt="http://schemas.microsoft.com/msus/2002/12/BaseTypes"
xmlns:cat="http://schemas.microsoft.com/msus/2002/12/UpdateHandlers/Category"
xmlns:drv="http://schemas.microsoft.com/msus/2002/12/UpdateHandlers/WindowsDriver"
            elementFormDefault="qualified"
            attributeFormDefault="unqualified">
    <import namespace="http://schemas.microsoft.com/msus/2002/12/BaseTypes" />
    <import namespace="http://schemas.microsoft.com/msus/2002/12/Update" />
    <import
namespace="http://schemas.microsoft.com/msus/2002/12/UpdateHandlers/Category" />
        <simpleType name="VersionMajorMinor">
            <annotation>
                <documentation>A major.minor version string, such as
"1.2".</documentation>
            </annotation>
            <restriction base="string">
                <pattern value="\d{1,5}\.\d{1,5}" />
            </restriction>
        </simpleType>
        <complexType name="FileLocationMap">
            <annotation>
                <documentation>The update id + revision number to revision id mapping
table</documentation>
            </annotation>
            <sequence>
                <element name="FileLocation" minOccurs="0" maxOccurs="unbounded">
                    <complexType>
                        <attribute name="Id" type="bt:FileDigest" use="required">
                            <annotation>
                                <documentation>The digest (hash) of the file, that both
uniquely identifies it and allows the MSUS Client to verify its
integrity.</documentation>
                            </annotation>
                        </attribute>
                        <attribute name="IsIncluded" type="boolean" use="optional"
default="false">
                            <annotation>
                                <documentation>Indicates whether the file is included
in the package or not.</documentation>
                            </annotation>
                        </attribute>
                        <attribute name="Url" type="string" use="required">
                            <annotation>
                                <documentation>The path suffix to the file. This is
appended onto the end of the path location (minus filename) to the package.xml
file.</documentation>
                            </annotation>
                        </attribute>
                    </complexType>
                </element>
            </sequence>
        </complexType>
        <simpleType name="DeploymentAction">
            <annotation>
                <documentation>The assessment of how installation/uninstallation of the
update will impact the system.</documentation>
            </annotation>
            <restriction base="token">
```

```
                    <enumeration value="Install">
                        <annotation>
                            <documentation>Update should be offered for
install.</documentation>
                        </annotation>
                    </enumeration>
                    <enumeration value="Evaluate">
                        <annotation>
                            <documentation>Update should not be offered for install. It is
deployed only as a detectoid.</documentation>
                        </annotation>
                    </enumeration>
                    <enumeration value="Bundle">
                        <annotation>
                            <documentation>Update should not be offered for install. It is
deployed as part of a bundle. It may be installed as part of the bundle, but should
not be offered explicitly</documentation>
                        </annotation>
                    </enumeration>
                </restriction>
            </simpleType>
            <simpleType name="DownloadPriority">
                <annotation>
                    <documentation>The download priority for the payload files of the
update.</documentation>
                </annotation>
                restriction base="token">
                    <enumeration value="High">
                        <annotation>
                            <documentation>Download should occur at high
priority.</documentation>
                        </annotation>
                    </enumeration>
                    <enumeration value="Normal">
                        <annotation>
                            <documentation>Download should occur at normal
priority..</documentation>
                        </annotation>
                    </enumeration>
                    <enumeration value="Low">
                        <annotation>
                            <documentation>Download should occur at low
priority.</documentation>
                        </annotation>
                    </enumeration>
                </restriction>
            </simpleType>
            <complexType name="Update">
                <annotation>
                    <documentation>Contains the data needed to perform detection and a
server sync for a single update</documentation>
                </annotation>
                <sequence>
                    <element name="PayloadFiles" minOccurs="0">
                        <annotation>
                            <documentation>The list of file digests for this update's
payload files.</documentation>
                        </annotation>
                        <complexType>
                            <sequence>
                                <element name="File" minOccurs="0" maxOccurs="unbounded">
                                    <complexType>
                                        <attribute name="Id" type="bt:FileDigest"
use="required" />
                                    </complexType>
                                </element>
                            </sequence>
                        </complexType>
                    </element>
                    <element name="EulaFiles" minOccurs="0">
                        <annotation>
                            <documentation>The list of file digests for this update's EULA
files.</documentation>
                        </annotation>
                        <complexType>
                            <sequence>
                                <element name="File" minOccurs="0" maxOccurs="unbounded">
                                    <complexType>
                                        <sequence>
```

-continued

```
                                            <element name="Language" maxOccurs="unbounded">
                                                <complexType>
                                                    <annotation>
                                                        <documentation>The short name of
the language (such as 'en' or 'ja') that the EULA serves.</documentation>
                                                    </annotation>
                                                    <attribute name="Name"
type="upd:LocalizedPropertiesLanguage" use="required" />
                                                </complexType>
                                            </element >
                                        </sequence>
                                        <attribute name="Id" type="bt:FileDigest"
use="required" />
                                    </complexType>
                                </element>
                            </sequence>
                        </complexType>
                    </element>
                    <element name="Categories" minOccurs="0">
                        <annotation>
                            <documentation>The list of categories to which the update
belongs</documentation>
                        </annotation>
                        <complexType>
                            <sequence>
                                <element name="Category" minOccurs="0"
maxOccurs="unbounded">
                                    <complexType>
                                        <attribute name="Id" type="upd:UpdateID"
use="required" />
                                        <attribute name="Type" type="cat:CategoryType"
use="required" />
                                    </complexType>
                                </element>
                            </sequence>
                        </complexType>
                    </element>
                    <element name="Prerequisites" minOccurs="0">
                        <annotation>
                            <documentation>A list of prerequisite conditions that are
evaluated during MSUS Client/Server communication to determine whether the update
is relevant enough to the Client to evaluate the applicability rules. If all
prerequisites are true, the Server sends the update to the Client for further
evaluation. The Client then evaluates the applicability rules to determine the
state of the update on the machine. Please see other specifications for the details
of this process.</documentation>         </annotation>
                        <complexType>
                            <choice minOccurs="0" maxOccurs="unbounded">
                                <element name="UpdateId">
                                    <complexType>
                                        <attribute name="Id" type="upd:UpdateID" />
                                    </complexType>
                                </element>
                                <element name="Or">
                                    <annotation>
                                        <documentation>A prerequisite condition that
contains other prerequisites and evaluates to true when at least one of them is
true. If they are all false, the OrGroup is false.</documentation>
                                    </annotation>
                                    <complexType>
                                        <sequence>
                                            <element name="UpdateId" maxOccurs="unbounded">
                                                <complexType>
                                                    <attribute name="Id"
type="upd:UpdateID" />
                                                </complexType>
                                            </element>
                                        </sequence>
                                    </complexType>
                                </element>
                            </choice>
                        </complexType>
                    </element>
                    <element name="SupersededBy" minOccurs="0">
                        <annotation>
                            <documentation>A list of update ids identifying updates
superseded by the current update.</documentation>
                        </annotation>
                        <complexType>
```

-continued

```
                <sequence>
                    <element name="Revision" minOccurs="0"
maxOccurs="unbounded">
                        <complexType>
                            <attribute name="Id" type="upd:RevisionID"
use="required">
                                <annotation>
                                    <documentation>The revision id of the
superseding update.</documentation>
                                </annotation>
                            </attribute>
                        </complexType>
                    </element>
                </sequence>
            </complexType>
        </element>
        <element name="BundledBy" minOccurs="0">
            <annotation>
                <documentation>A list of revision ids specifying the bundle
updates that contain the current update</documentation>
            </annotation>
            <complexType>
                <sequence>
                    <element name="Revision" minOccurs="0"
maxOccurs="unbounded">
                        <complexType>
                            <attribute name="Id" type="upd:RevisionID"
use="required">
                                <annotation>
                                    <documentation>The revision id of the
bundling update.</documentation>
                                </annotation>
                            </attribute>
                        </complexType>
                    </element>
                </sequence>
            </complexType>
        </element>
        <element name="Languages" minOccurs="0">
            <annotation>
                <documentation>A language that the update has been localized
to. If this element is not present or contains no Language elements, the update is
language-independent. This refers to the languages supported by the update
binaries, as opposed to the languages that the metadata supports which are
upd:LocalizedPropertiesLanguage.</documentation>
            </annotation>
            <complexType>
                <sequence>
                    <element name="Language" maxOccurs="unbounded">
                        <complexType>
                            <annotation>
                                <documentation>The short name of the language
(such as 'en' or 'ja')</documentation>
                            </annotation>
                            <attribute name="Name" type="upd:UpdateLanguage"
use="required" />
                        </complexType>
                    </element>
                </sequence>
            </complexType>
        </element>
    </sequence>
    <attribute name="IsBundle" type="boolean" default="false">
        <annotation>
            <documentation>Whether or not the update is a bundle
update</documentation>
        </annotation>
    </attribute>
    <attribute name="IsSoftware" type="boolean" default="true">
        <annotation>
            <documentation>Whether or not the update is a software update, as
opposed to a detectoid or category update</documentation>
        </annotation>
    </attribute>
    <attribute name="IsLeaf" type="boolean" default="false">
        <annotation>
            <documentation>Whether or not the update is a leaf update. This
value is used to populate the Deployment.IsLeaf field in the SyncInfo and
RefreshCacheResults structures.</documentation>
```

-continued

```
            </annotation>
        </attribute>
        <attribute name="DeploymentAction" type="ols:DeploymentAction"
default="Install">
            <annotation>
                <documentation>The deployment action for the
update.</documentation>
            </annotation>
        </attribute>
        <attribute name="CreationDate" type="dateTime" use="required">
            <annotation>
                <documentation>The UTC date and time that this revision of the
update's metadata was authored.</documentation>
            </annotation>
        </attribute>
        <attribute name="DefaultLanguage" type="string" use="required">
            <annotation>
                <documentation>The default properties language that should be
returned to the agent if a particular requested language could not be found for the
update.</documentation>
            </annotation>
        </attribute>
        <attribute name="UpdateId" type="upd:UpdateID" use="required">
            <annotation>
                <documentation>The update id.</documentation>
            </annotation>
        </attribute>
        <attribute name="RevisionNumber" type="upd:RevisionNumber" use="required">
            <annotation>
                <documentation>The revision number of the update.</documentation>
            </annotation>
        </attribute>
        <attribute name="RevisionId" type="upd:RevisionID" use="required">
            <annotation>
                <documentation>The server specific unique identifier for a
particular revision of an update.</documentation>
            </annotation>
        </attribute>
        <attribute name="DownloadPriority" type="ols:DownloadPriority"
default="Normal">
            <annotation>
                <documentation>The download priority for the
update.</documentation>
            </annotation>
        </attribute>
    </complexType>
    <element name="OfflineSyncPackage" type="ols:OfflineSyncPackage" />
    <complexType name="OfflineSyncPackage">
        <annotation>
            <documentation>The master file for an offline sync
package.</documentation>
        </annotation>
        <sequence>
            <element name="ConfigProperties" minOccurs="0">
                <annotation>
                    <documentation>A set of configuration properties. These map to
the configuration properties a server can return as part of the
ClientWebService::Config structure.</documentation>
                </annotation>
                <complexType>
                    <sequence>
                        <element name="Property" minOccurs="0"
maxOccurs="unbounded">
                            <complexType>
                                <attribute name="name" type="string" use="required"
/>
                                <attribute name="value" type="string"
use="required" />
                            </complexType>
                        </element>
                    </sequence>
                </complexType>
            </element>
            <element name="Updates">
                <annotation>
                    <documentation>The set of updates included in this
package.</documentation>
                </annotation>
                <complexType>
```

-continued

```
            <sequence>
                    <element name="Update" type="ols:Update"
maxOccurs="unbounded" />
            </sequence>
        </complexType>
    </element>
    <element name="FileLocations" type="ols:FileLocationMap" minOccurs="0">
        <annotation>
            <documentation>The set of files belonging to updates included
in this package.</documentation>
        </annotation>
    </element>
</sequence>
<attribute name="ContainsPayload" type="boolean" use="optional"
default="false">
    <annotation>
        <documentation>Whether or not the package contains payload
files</documentation>
    </annotation>
</attribute>
<attribute name="ContainsEULAs" type="boolean" use="optional"
default="false">
    <annotation>
        <documentation>Whether or not the package contains EULA files.
Note that if ContainsPayload is true, this value is assumed to be
true.</documentation>
    </annotation>
</attribute>
<attribute name="MinimumClientVersion" type="bt:Version" use="required">
    <annotation>
        <documentation>The minimum version of the client that can use this
package. The fake web service should fail if it encounters a package with a client
whose version is less than this minimum.</documentation>
    </annotation>
</attribute>
<attribute name="ProtocolVersion" type="ols:VersionMajorMinor"
use="required">
    <annotation>
        <documentation>The version of the protocol that this package was
authored with.</documentation>
    </annotation>
</attribute>
<attribute name="PackageId" type="bt:Guid" use="required">
    <annotation>
        <documentation>An id that uniquely identifies this
package.</documentation>
    </annotation>
</attribute>
<attribute name="SourceId" type="bt:Guid" use="required">
    <annotation>
        <documentation>The server id that this package was generated
from.</documentation>
    </annotation>
</attribute>
<attribute name="CreationDate" type="dateTime" use="required">
    <annotation>
        <documentation>The UTC date and time that the package was created
on.</documentation>
    </annotation>
</attribute>
<attribute name="PackageVersion" type="ols:VersionMajorMinor"
use="required">
    <annotation>
        <documentation>The version of the offline sync package
format.</documentation>
    </annotation>
</attribute>
        </complexType>
</schema>
```

With regard to FIG. 4, the exemplary update package 302 includes any number of update fragments 404. While the simplified description of FIG. 1 seems to illustrate the transfer of an update package from the update source 104 to the client computer 102 occurs in a single transaction, in an actual embodiment, numerous small transactions/communications occur to transfer various information regarding updates from the update source 104 to the client computer. Correspondingly, the update fragments 402 represent the smaller transactions that may occur between the update source 104 and the client computer 102 when determining which updates may be applicable to the client computer. Update fragments may include, but are not limited to, information as to how to evaluate whether a particular update is applicable to the client computer, the properties of the a particular update, user-readable descriptions corresponding to an update, instructions as to how to install the update on the client computer, an update identifier, relationship information (such as whether the update is dependent upon another update, or whether the update is superseded by another, etc.), and the like. For each update in the update package 302, a set of update fragments is also included in the package.

In regard to the update payload 408, in many instances, the size of the update payload files and/or data can exceed the capacity of the computer-readable media. Thus, according to the present invention, update payload files and/or data may or may not be included in the update package. As indicated above, a update payload data/files table is included that identifies the actual location of the update payload data and/or files. The files needed to install the update identified in the update package 302 are identified in the update payload data/files table. According to one embodiment, the entries in the update payload data/files table are universal resource locators (URLs), indicating the location of the payload, whether they are included as part of the update package, or whether they are located external to the client computer.

While various components of an update package 302 have been described above, it should be appreciated that other components may also be included within the update package. Accordingly, the components listed above should be viewed as illustrative, but not limiting upon the present invention.

With regard to the format of the update package on the computer-readable media 210, it is important that all elements, files, and data of the update package 302 be delivered as a single unit. Furthermore as can be seen, an update package 302 may include numerous files and data, and frequently, the storage capacity of the computer-readable media may be insufficient to contain all update information. Thus, for these reasons and others, according to aspects of the present invention, the update package 302 is generated such that its contents are contained in a single package file which can be later extracted by the media module 210 during a software installation or verification process.

Figure 6:
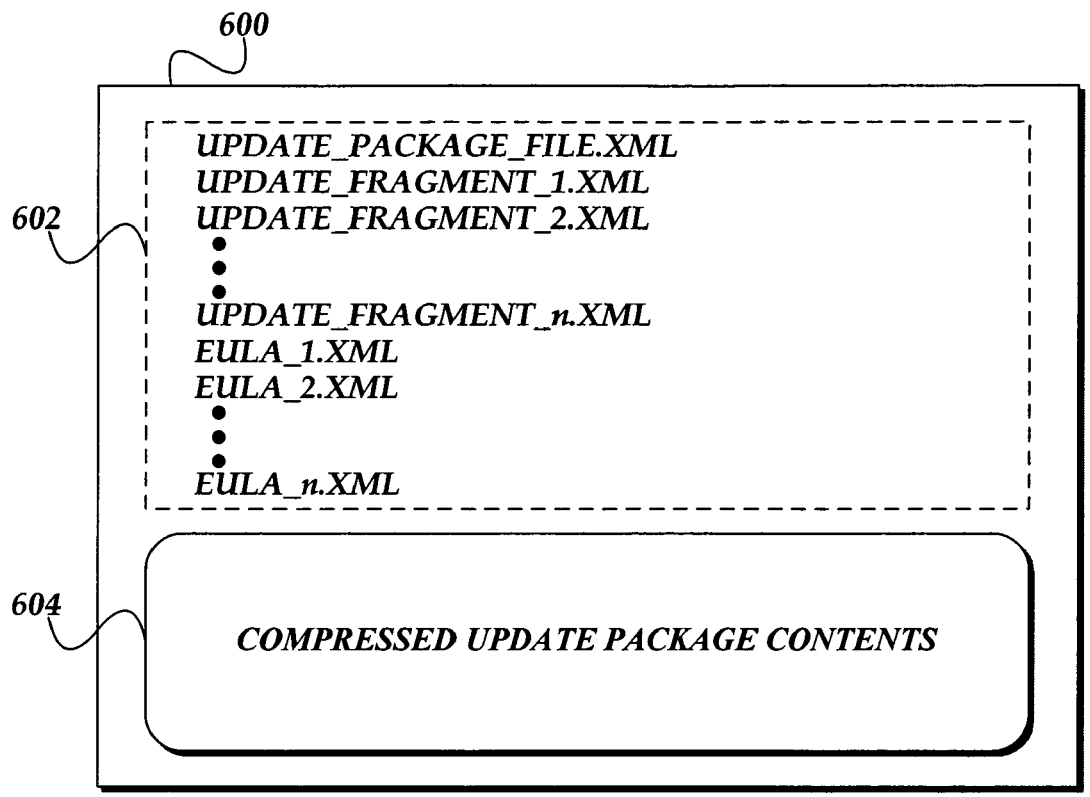
FIG. 6 is a block diagram illustrating a compressed update package suitable for delivery to a client computer on computer-readable media.

One way in which an update package can be delivered as a single package file is to put all files related to the update package in a compressed file. Compression techniques that collect one or more files into a single, compressed file are well known in the art. FIG. 6 is a block diagram illustrating an exemplary update package embodied in a compressed file 600. As is typical with compressed files, the exemplary compressed file 600 has two parts, a directory area 602 and a compressed data area 604. The directory area 602 includes a list of all of the contents of the compressed file 600, including, but not limited to, the update catalog file, update fragments associated with the updates of the update package, and the EULAs included in the update package. The compressed data area 604 includes the actual files (such as the update catalog file, the update fragments, the EULAs, and the like) collected together and compressed.

Figure 7:
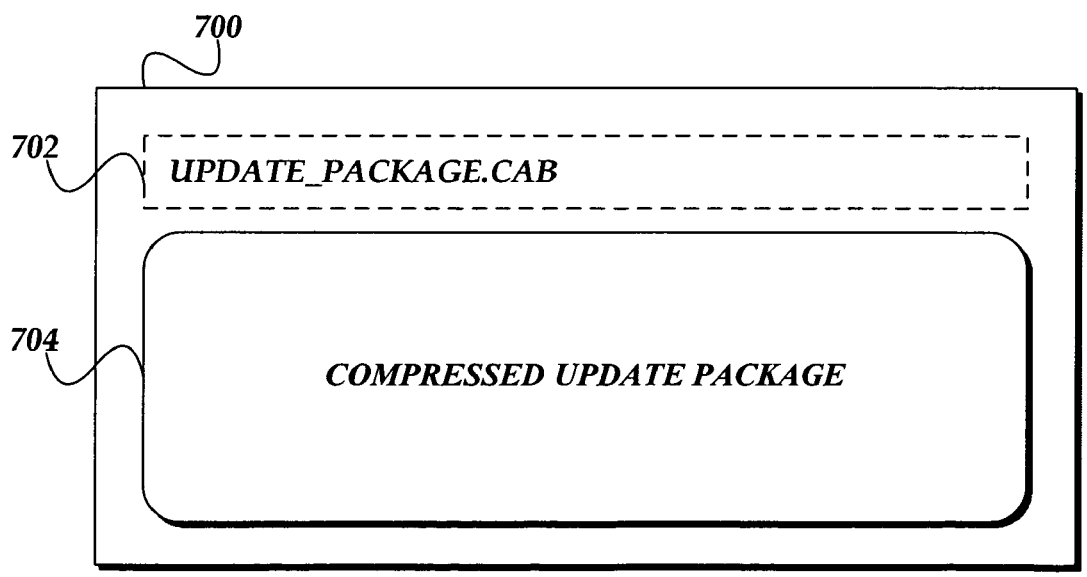
FIG. 7 is a block diagram illustrating a doubly compressed update package suitable for delivery to a client computer on computer-readable media.

In an actual embodiment, for various reasons, including the ability to identify the contents of the compressed file 600, the directory area 602 of the compressed file is not compressed. However, as mentioned earlier, an update package may frequently include thousands of update fragments. Thus, even though text strings, which are typically used to identify the contents of the compressed file, can be substantially compressed using known compression techniques, their presence in the directory area 602 precludes their compression. Accordingly, in an actual embodiment of the present invention, the update package is twice compressed. In other words, the resultant compressed file 600 is then the subject matter of another compressed file. FIG. 7 is a block diagram illustrating the resultant doubly compressed file 700.

Similar to the contents of the compressed file 600 of FIG. 6, the compressed file 700 includes both a directory area 702 and a compressed data area 704. However, unlike the large number of listings in the directory area 602 of FIG. 6, the directory area 702 of FIG. 7 includes only one listing: the once-compressed update package. The compressed data area 704 includes the once-compressed update package, but this time compressed again. While typical compression techniques do not lend themselves to recompression, twice compressing the update package results in significant savings as the directory area 602 containing thousands of file listings can be reduced.

In an actual embodiment, a twice-compressed update package is stored on the computer-readable media 210, which is delivered to a client computer 102.

While various embodiments, including the preferred embodiment, of the invention have been illustrated and described, it will be appreciated that various changes can be made therein without departing from the spirit and scope of the invention.

The embodiments of the invention in which an exclusive property or privilege is claimed are defined as follows:

1. A tangible computer-readable medium bearing an update package for use by an update agent to perform an offline update of a software application on a client computer, the update package comprising:
  an update catalog file, the update catalog file comprising:
    a list of updates available in the update package; and
    a table of file locations of update payloads corresponding to each update available in the update package;
  a set of update fragments for each update available in the update catalog file, wherein each update fragment represents a communication exchange of update transaction information simulating information to be exchanged between the client computer and an online update service when communication with the online update service is unavailable, and wherein each set of update fragments corresponds to a set of transaction information and which is used by an update agent's media module to simulate communication with the online update service in responding to communications from the update agent's communication module when the communication module when the communication with the online update service is unavailable; and
  an update payload, wherein the update payload includes at least one update file for an update available in the update catalog file, and such that the update file effectuates one or more modifications on the software application, wherein the update payload is installed by the update agent using the media module.

2. The computer-readable medium of claim 1, wherein the update catalog file is an eXtensible Markup Language ("XML") document formatted according to a predetermined update catalog file schema.

3. The computer-readable medium of claim 2, wherein each entry in the table of file locations comprises a uniform resource locator (URL) describing the location of a file corresponding to an update available in the update package.

4. The computer-readable medium of claim 3, wherein the update package further comprises configuration information, the configuration information including a minimum software application version number identifying the minimum revision number of the software application required in order to use the update package in an offline update process.

5. The computer-readable medium of claim 4, wherein the configuration information further includes a payload indicator that indicates which update payloads for the updates available in the update package are included in the update package.

6. The computer-readable medium of claim 5, wherein the update package further comprises a set of end user licensing agreements (EULAs).

7. The computer-readable medium of claim 6, wherein the configuration information further includes a EULA indicator that indicates whether EULAs corresponding to the updates available in the update package are included in the update package.

8. The computer-readable medium of claim 7, wherein the update package further comprises update fragments, such that for each update available in the update package a corresponding set of update fragments is included in the update package.

9. The computer-readable medium of claim 8, wherein an update fragment includes installation instructions for its corresponding update.

10. The computer-readable medium of claim 9, wherein an update fragment includes relationship information, identifying a relationship of its corresponding update to another update.

11. The computer-readable medium of claim 10, wherein the relationship of the corresponding update to another update is a dependency relationship.

12. The computer-readable medium of claim 7, wherein the configuration information further includes an update source identifier that unique identifies the update source from which the contents of the update package were obtained.

13. The computer-readable medium of claim 8, wherein the update package is a compressed filed including a directory area and a compressed data area, the directory area listing all files included in the compressed file, and the compressed data area including the compressed files.

14. The computer-readable medium of claim 13, wherein the update package is a twice-compressed file, such that the directory area lists only one once-compressed file and the data area comprises the once-compressed file, and when extracted from the twice-compressed file, the directory area of the once-compressed file lists all files included in the once-compressed file, and the data area of the once-compressed file comprises the files listed in the directory area of the once-compressed file.

15. The computer-readable medium of claim 1, wherein the computer-readable medium is an optical disc.

16. A client computer comprising:
  a processor configured to execute an update package for a software application stored on the client computer; and
  an update agent that updates the software application on the client computer according to software update data from an update source, the update agent including:
    a communication module configured to obtain software update data from the update source over a communication network, and further configured to obtain software update data from a media module when communication between the update agent and the update source over the communication network is unavailable; and
    a media module configured to respond to the communication module in simulating an online update source according to update data stored on tangible computer-readable media, the update data comprising:
      a plurality of update fragments, each update fragment representing a communication exchange of update transaction information simulating information to be exchanged between the client computer and an online update service when communication with the online update service is unavailable, wherein the media module uses the plurality of update fragments to implement the same communication interfaces as the update source when the communication module communicates with the update source over the communication network such that when the client computer is offline, the medium module is used to update the software application in a manner similar to that used to update the software application when the client computer is online with the update source; and
      an update payload, wherein the update payload includes at least one update file for an update available in the update catalog file, and such that that the update file effectuates one or more modifications on the software application; and
    wherein the communication module is further configured to communicate with the media module in the same manner as it would communicate with the update source.

17. The client computer of claim 16, wherein the communication module communicates with the update source via a set of Web services, and wherein the media module implements the same Web services as the update source.

18. The client computer of claim 17, wherein the update data stored on the computer-readable media includes:
  an update files table indicating the location of update payload files corresponding to each update in the update data; and
  a update payload indicator signaling which update payload files corresponding to the updates in the update data are included on the computer-readable media; and
  wherein the update agent is configured to obtain the update data from the media module and obtain the update payload files from a location other than the computer-readable media if the update payload indicator signals that one or more update payload files are not included on the computer-readable media.

19. The client computer of claim 16, wherein the tangible computer-readable media comprises an optical disc.

* * * * *